(12) United States Patent
Skinner (10) Patent No.: US 11,007,813 B2
(45) Date of Patent: May 18, 2021

(54) INTEGRATED HIGHLIGHTING AND SHADING MARKER SYSTEM

(71) Applicant: Crayola LLC, Easton, PA (US)

(72) Inventor: Craig Skinner, Nazareth, PA (US)

(73) Assignee: CRAYOLA LLC, Easton, PA (US)

( * ) Notice: Subject to any disclaimer, the term of this patent is extended or adjusted under 35 U.S.C. 154(b) by 8 days.

(21) Appl. No.: 16/394,356

(22) Filed: Apr. 25, 2019

(65) Prior Publication Data

US 2019/0329585 A1 Oct. 31, 2019

Related U.S. Application Data

(60) Provisional application No. 62/662,475, filed on Apr. 25, 2018.

(51) Int. Cl.
| | | |
|---|---|---|
| *B43K 27/00* | (2006.01) | |
| *B43K 1/00* | (2006.01) | |
| *B43K 5/02* | (2006.01) | |
| *C09D 11/17* | (2014.01) | |
| *C09D 11/50* | (2014.01) | |

(52) U.S. Cl.
CPC .............. *B43K 27/00* (2013.01); *B43K 1/006* (2013.01); *B43K 5/025* (2013.01); *C09D 11/17* (2013.01); *C09D 11/50* (2013.01)

(58) Field of Classification Search
CPC ......... B43K 27/02; B43K 27/04; C09D 11/18
See application file for complete search history.

(56) References Cited

U.S. PATENT DOCUMENTS

| | | |
|---|---|---|
| 2,953,454 A | 9/1960 | Berman |
| 3,022,318 A | 2/1962 | Berman et al. |
| 4,367,170 A | 1/1983 | Uhlmann et al. |
| 4,720,301 A | 1/1988 | Kito et al. |
| 5,219,625 A | 6/1993 | Matsunami et al. |
| 5,326,388 A | 7/1994 | Miller et al. |
| 5,352,282 A | 10/1994 | Miller |
| 5,460,647 A | 10/1995 | Snedeker et al. |
| 5,464,470 A | 11/1995 | Brachman et al. |
| 5,478,382 A | 12/1995 | Miller et al. |
| 5,486,228 A | 1/1996 | Miller et al. |
| 5,489,331 A | 2/1996 | Miller et al. |
| 5,492,558 A | 2/1996 | Miller et al. |
| 5,498,282 A | 3/1996 | Miller et al. |
| 5,558,700 A | 9/1996 | Shibahashi et al. |
| 5,591,255 A | 1/1997 | Small et al. |
| 5,997,849 A | 12/1999 | Small et al. |
| 6,139,779 A | 10/2000 | Small et al. |
| 6,494,950 B1 | 12/2002 | Fujita et al. |
| 7,229,487 B2 * | 6/2007 | Godbout ............... B43K 27/12 106/31.32 |
| 7,494,537 B2 | 2/2009 | Ono et al. |
| 8,801,976 B2 | 8/2014 | Choi |

(Continued)

*Primary Examiner* — Jennifer C Chiang
(74) *Attorney, Agent, or Firm* — Ratnerprestia (57) ABSTRACT

An integrated highlighting marker includes a multi-component marker ink comprising a base colorant and a tinting colorant. The marking system also includes a highlighting component configured to transform the base colorant from a first colored state to a second colored state based on the tinting colorant. The highlighting component may be configured to transform the primary base colorant from a colored state to a transparent state to reveal the tinting colorant.

17 Claims, 3 Drawing Sheets

(56) References Cited

U.S. PATENT DOCUMENTS

| | | | |
|---|---|---|---|
| 8,865,621 B2 * | 10/2014 | Kwan | C09D 11/17 |
| | | | 503/201 |
| 9,321,927 B2 | 4/2016 | Allison et al. | |
| 9,493,668 B2 * | 11/2016 | Clayton | C09D 11/16 |
| 9,745,487 B2 | 8/2017 | Wang et al. | |
| 9,777,178 B2 | 10/2017 | Clayton et al. | |

* cited by examiner

INTEGRATED HIGHLIGHTING AND SHADING MARKER SYSTEM

CROSS REFERENCE TO RELATED APPLICATION

This application claims benefit of the filing date of U.S. Provisional Application Ser. No. 62/662,475, filed on Apr. 25, 2018, the disclosure of which is incorporated herein by reference in its entirety for all purposes.

FIELD OF THE INVENTION

The present invention relates to integrated highlighting marker systems, unitary marking devices for transforming a base color marking to a highlighted base-color marking and methods for changing the color of a portion of an applied ink marking.

BACKGROUND OF THE INVENTION

Consumers require differential marking capability as, for instance, those who routinely highlight clauses of written material of particular relevance, may further want to differentiate between various highlighted clauses of written material to set apart certain material. Generally, marks are changed by placing the mark of one color over the mark of another color. When performing this using traditional marking pens, the marks produced are often not the desired colors and the tips of the markers get soiled with the other inks, rendering the marker useless. Also, with traditional highlighter inks, the colors tend to bleed together, resulting in undesirable color smears and combinations. Furthermore, oftentimes the use of a second color over the first renders the text illegible. Therefore, there has been a long felt need for coloring compositions, for use as inks for highlighting, and markers containing such compositions, which produce marks of a first base color that can be readily changed from colored to transparent, thereby revealing a second tinted color, while leaving the highlighted indicia easily visible (i.e., have "read-through" capability). Optimally, such compositions can be used on different types of paper without fading. Hence, there is a need for new integrated highlighting marking system and unitary marking device.

SUMMARY OF THE INVENTION

Embodiments of the invention are defined by the claims below, not this summary. A high-level overview of various aspects of the invention disclosure introduces a selection of concepts that are further described below in the detailed description. This summary is not intended to identify key features or essential features of the claimed subject matter, nor is it intended to be used as an aid in isolation to determine the scope of the claimed subject matter.

The present invention provides a system, method, and device for tinting colors dispensed from a marking device. In some aspects, a marking device for coloring, such as a porous marker nib, is configured to generate base ink markings that may be selectively transformed into a tinted color. In further aspects, a multi-component ink formulation comprising both reactive base colorant (e.g., pH-sensitive) and non-reactive tinted colorant (e.g., non-pH sensitive highlighting) that, when applied to a marking surface, exhibit the colorant features of the reactive/base color within the ink formulation.

In some aspects, upon treatment by a tinting mechanism such as a pH-altering highlighting component, the reactive base ink color may be removed and the non-reactive tinted colorant marking may remain to provide a modified marking in place of the original marking. In some aspects, the tinting mechanism generates a removal or alteration of the base ink colorant (i.e., "bleaching out" the primary color) to reveal a secondary color, such as a lighter, "tinted" color having the appearance of a highlighted base-color marking.

Thus, in an aspect, the present invention is directed to an integrated highlighting marker system, comprising:
a multi-component marker ink comprising a base colorant and a tinting colorant; and
a highlighting component configured to transform the base colorant from a first colored state to a second colored state based on the tinting colorant.

In an embodiment of the integrated highlighting marker system, the second colored state is transparent, such that the color of the tinting colorant is revealed.

In another embodiment, the integrated highlighting marker system includes a porous marker nib.

In another embodiment, the base colorant of the multi-component marker ink comprises at least one reactive base-color ink component and the tinting colorant comprises at least one non-reactive tinting ink component.

In an embodiment, the at least one reactive base-color ink component is selected from the group consisting of a photochromic ink, a thermochromic ink, and a pH-reactive ink.

In another embodiment, the highlighting component is selected from the group consisting of a light source, a heat-creating source, and a pH-altering agent.

In yet another embodiment, the base colorant comprises two or more reactive base-color ink components, and wherein each of the two or more reactive base-color ink components reacts at a different pH.

In another embodiment, the highlighting component comprises a bleaching agent and/or a reducing agent.

The present invention also provides a method for tinting an applied ink marking, comprising:
applying a multi-component marker ink to a marking surface to provide a base-color marking, wherein the multi-component marker ink comprises a base colorant and a tinting colorant, wherein the base colorant comprises at least one reactive base-color ink component corresponding to an appearance of a base-color marking, and wherein the tinting colorant comprises at least one non-reactive tinting ink component; and
contacting at least a portion of the applied multi-component marker ink with a highlighting component configured to interact with the at least one reactive base-color ink component to change the base colorant from a first colored state to a second colored state based on the tinting colorant, thereby providing an appearance of a highlighted base-color marking.

In one embodiment of the method described above, the multi-component marker ink is applied with a first porous marker nib, and at least a portion of the applied multi-component marker ink is contacted with a tinting mechanism with a second porous marker nib.

In another embodiment of the method described above, the highlighting component is a pH-altering agent, a bleaching agent, or a reducing agent.

An aspect of the present invention also provides a unitary marking device for transforming a primary ink color to a secondary highlighted color, wherein the marking device comprises:

a first marking unit comprising a multi-component marker ink comprising a base colorant and a tinting colorant; and a second marking unit comprising a highlighting component configured to transform the base colorant from a first colored state to a second colored state based on the tinting colorant.

In one embodiment of the unitary marking device as described above, each of the first marking unit and the second marking unit comprises a porous marker nib.

In an embodiment, the second colored state is transparent, such that the color of the tinting colorant is revealed.

In another embodiment, the base colorant is configured to react with the highlighting component such that the base colorant transforms from the first colored state to the second colored state.

In yet another embodiment, the highlighting component comprises a pH-altering highlighting component, and the base colorant comprising a pH-reactive ink.

In another embodiment, the highlighting component comprises a heat-creating component, and the base colorant comprising a thermochromic ink.

In an another embodiment, the unitary marking device as described above further comprises a third marking unit comprising a second multi-component marker ink comprising a second base colorant and a second tinting colorant, wherein the highlighting component is configured to transform the second base colorant from a second colored state to a transparent state to reveal the second tinting colorant.

In an aspect of the present invention, the base colorant of the multi-component marker ink comprises at least one photochromic base-color ink component.

In another embodiment, the highlighting component is a light source such as a blue or UV LED, which light source may be used to activate the at least one photochromic base-color ink component.

In an aspect of the present invention, the base colorant of the multi-component marker ink comprises at least one thermochromic base-color ink component.

In another embodiment, the highlighting component is a heat-creating source such as a rubber nib, which may be used to create friction, and thereby heat, to activate the at least one thermochromic base-color ink component.

In another embodiment, the unitary marking device further comprises a third marking unit comprising a second multi-component marker ink comprising a second base colorant and a second tinting colorant, wherein the highlighting component is configured to transform the second base colorant from a third colored state to a fourth colored state based on the second tinting colorant.

An aspect of the present invention also provides a method for tinting an applied ink marking, comprising:

applying a multi-component marker ink to a marking surface to provide a base-color marking, wherein the multi-component marker ink comprises a base colorant and a tinting colorant, wherein the base colorant comprises at least one reactive base-color ink component corresponding to an appearance of a base-color marking, and wherein the tinting colorant comprises at least one non-reactive tinting ink component; and irradiating at least a portion of the applied multi-component marker ink with a highlighting component configured to photochemically interact with the at least one photochromic base-color ink component to change the base colorant from a first colored state to a second colored state based on the tinting colorant, thereby providing an appearance of a highlighted base-color marking.

In an aspect of the present invention, there is also provided a unitary marking device for transforming a primary ink color to a secondary highlighted color, wherein the marking device comprises:

a first marking unit comprising a multi-component marker ink comprising a base colorant and a tinting colorant; and a second marking unit comprising a highlighting component comprising a light source configured to photochemically transform the base colorant from a first colored state to a second colored state based on the tinting colorant.

DESCRIPTION OF THE DRAWINGS

Illustrative embodiments of the invention are described in detail below with reference to the attached drawing figures, and wherein.

DETAILED DESCRIPTION OF THE INVENTION

The subject matter of embodiments of the invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

The present invention provides a system, method, and device for tinting colors dispensed from a marking device. In some aspects, a marking device for coloring, such as a porous nib ink marker, is configured to generate base-color ink markings that may be selectively transformed into a tinted color. In further aspects, a base-color ink formulation comprising both reactive (e.g., pH-sensitive base) and non-reactive (e.g., non-pH sensitive tinting) colorants that, when applied to a marking surface, exhibit the colorant features of the reactive/base color within the ink formulation.

Figure 1A:
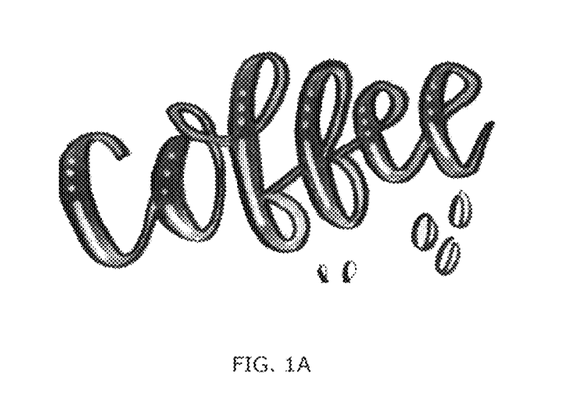
FIGS. 1A-1C are exemplary marks from an integrated highlighting marker system, in accordance with aspects of the invention.
Figure 1B:
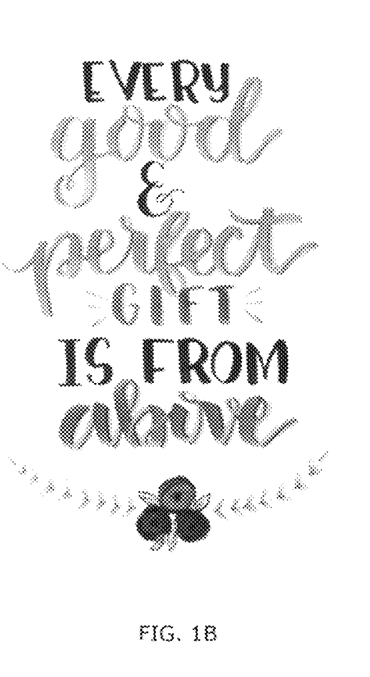
Figure 1C:
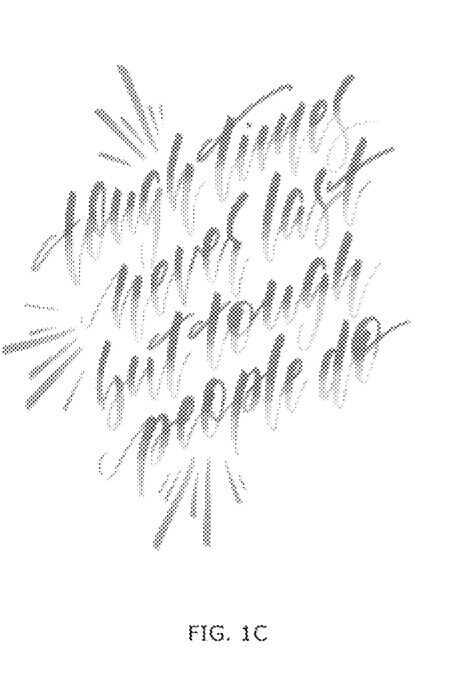
Figure 2A:
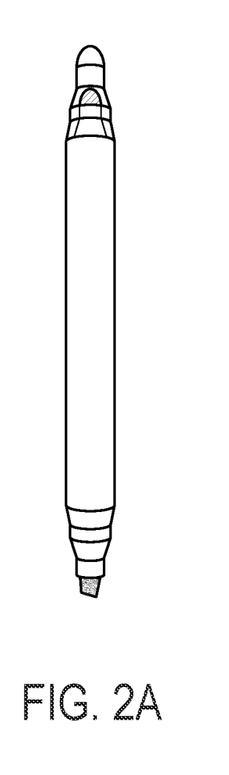
FIGS. 2A and 2B show exemplary unitary marking devices having the porous nibs of the first and the second marking units on the opposite ends of the unitary marking device, in accordance with aspects of the invention.
Figure 2B:
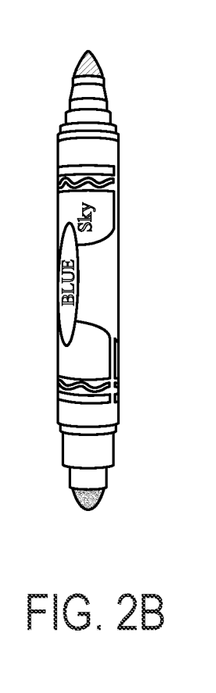

In some aspects, upon treatment by a tinting mechanism such as a pH-altering highlighting component, the reactive base ink color may be removed from visibility and/or transformed into a different state, such as state of less color intensity or a transparent state. In some aspects, the non-reactive tinting color marking may remain to provide a modified marking in place of the original marking, providing an appearance of a highlighted base-color marking, as shown in FIGS. 1-2. In other words, the reactive base ink may appear as the primary colorant of the marking, and when "erased" or highlighted away by application of a state-changing tinting treatment, the remaining visible color may be that of the secondary, non-reactive highlight colorant. In some aspects, the tinting mechanism generates a removal of the base ink colorant (i.e., "bleaching out" the primary color) to selectively reveal the secondary color, such as a lighter color having a highlighting appearance.

In one aspect, an integrated highlighting marker system may include a multi-component marker ink having a base colorant and a tinting colorant. In some aspects, the base colorant is a darker ink that appears as the visible color from initial markings with the multi-component marker ink. In further aspects, the tinting color is a color with less intensity than the base color, which is still visible as a marking once the base colorant is removed, altered, lessened, and/or reacted. In further aspects, the integrated highlighting marker system includes a highlighting component configured to transform the base colorant from a first colored state to a second colored state based on the tinting colorant), or from a first colored state to a second colored state such as transparent state to reveal the tinting colorant.

Non-Reactive Tinting &/or Base Colorant Ink Component

In an embodiment, the non-reactive tinting colorant is a washable tinting colorant ink composition, as described in U.S. Pat. No. 9,321,927 B2, incorporated herein by reference in its entirety. The non-reactive tinting colorant ink composition may comprise about 70 wt. % to about 95 wt. % water; about 5 wt. % to about 35 wt. % one or more sugars (e.g., dextrins); about 1 wt. % to about 40 wt. % one or more optional dye blockers; about 0.1 wt. % to about 15 wt. % one or more non-reactive dyes; and one or more optional additives.

For example, the non-reactive tinting colorant ink composition may comprise, consist essentially of, or consist of about 70 wt. % to about 95 wt % or about 70 wt. % to about 85 wt. % water, about 5 wt. % to about 35 wt. % or about 10 wt. % to about 30 wt. % one or more sugars such as dextrins, about 1 wt. % to about 40 wt. % or about 5 wt. % to about 35 wt. % one or more optional dye blockers, about 0.5 wt. % to about 10 wt. % one or more dyes (e.g., one or more acid dyes), and one or more optional additives. According to particular embodiments, the one or more sugars are selected from the group consisting of dextrans and dextrins.

Cyclodextrins (sometimes called cycloamyloses) are cyclic oligosaccharides that contain glucose units, i.e., ($\alpha$-1, 4)-linked $\alpha$-D-glucopyranose units, bound together in a ring. Cyclodextrins are typically produced from starch by means of enzymatic conversion. Typical cyclodextrins contain a number of glucose monomers ranging from six to eight units in a ring, creating a cone or hollow stopper shape; for example, $\alpha$(alpha)-cyclodextrin comprises a 6-membered sugar ring molecule, $\beta$(beta)-cyclodextrin comprises a 7-membered sugar ring molecule; and $\gamma$(gamma)-cyclodextrin comprises an 8-membered sugar ring molecule. The cyclodextrins suitable for the compositions of the present invention can, if desired, be modified by the addition of substituents. As used herein, "cyclodextrins" include both modified and unmodified cyclodextrins. Substituents generally replace either the entire hydroxyl group or the hydrogen atom on one or more of the hydroxyl groups of the cyclodextrin ring. Non-limiting examples include hydroxypropyl $\beta$-cyclodextrin, methyl $\beta$-cyclodextrin, and sulfobutyl ether $\beta$-cyclodextrin.

The one or more cyclodextrins in embodiments of the base colorant of the present invention may be selected from the group consisting of one or more $\alpha$-cyclodextrins, one or more $\beta$-cyclodextrins, one or more $\gamma$-cyclodextrins, and mixtures thereof. According to preferred embodiments, the one or more cyclodextrins comprise, consist essentially of or consist of one or more $\beta$-cyclodextrins. In many cases, the $\beta$-cyclodextrins demonstrate better solubility in the aqueous compositions of the present invention, and generally associate better with certain dye(s), particularly acid dyes (e.g., acid blue 9 (Color Index (C.I.) 42090; CAS number 3844-45-9), acid red 52 (CAS number 3520-42-1), acid red 18 (C.I. 16255; CAS number 2611-82-7), acid yellow 17 (C.I. 18965; CAS number 6359-98-4), acid yellow 23 (C.I. 19140; CAS number 1934-21-0), acid yellow 36 (C.I. 13065; CAS number 587-98-4), or FD&C Yellow 6 (C.I. 15985; CAS number 2783-94-0)), compared to $\alpha$-cyclodextrinsand$\gamma$-cyclodextrins. This is possibly due to the sizes and morphologies of both the dye(s) and $\beta$-cyclodextrins.

According to particular embodiments, the one or more cyclodextrins are selected from the group consisting of hydroxypropyl $\beta$-cyclodextrin, methyl $\beta$-cyclodextrin, sulfobutyl ether $\beta$-cyclodextrin, and combinations thereof. Preferably, the one or more cyclodextrins are selected such that the composition has the same color brightness, or greater color brightness, compared to the dye(s) alone, particularly acid dyes (e.g., acid blue 9 (Color Index (C.I.) 42090; CAS number 3844-45-9), acid red 52 (CAS number 3520-42-1), acid red 18 (C.I. 16255; CAS number 2611-82-7), acid yellow 17 (C.I. 18965; CAS number 6359-98-4), acid yellow 23 (C.I. 19140; CAS number 1934-21-0), acid yellow 36 (C.I. 13065; CAS number 587-98-4), or FD&C Yellow 6 (C.I. 15985; CAS number 2783-94-0). It is believed that this occurs when the cyclodextrin associates with the dye(s) in such a way that the color brightness of the dye is retained or enhanced, i.e., the cyclodextrin does not bind the dye(s) in such a way that it causes the color of the dye(s) to become hidden or muted in the final composition. In an exemplary embodiment, the one or more cyclodextrins comprise, consist essentially of, or consist of hydroxypropyl $\beta$-cyclodextrin (e.g., CAVASOL® W7 HP, Wacker Chemie). Any cyclodextrin readily ascertainable by those skilled in the art may be suitable for use in the ink compositions of the present invention, preferably as long as the ink demonstrates enhanced rinsability and/or washability, and/or the same or greater color brightness as the dye(s) alone, as described herein. According to particular embodiments, the one or more cyclodextrins are present in amounts ranging from about 5 wt. % to about 35 wt. %.

Surfactants may be used to lower the surface tension of the base colorant ink composition. Any surfactant readily ascertainable by those skilled in the art may be suitable for use in the ink compositions of the present invention. Examples of suitable surfactants include non-ionic surfactants, such as Dynol® 604 and Triton® x-405. An additional example of a surfactant that may be used to adjust surface tension is Silwet® L-77. According to particular embodiments, the one or more surfactants are present in the composition in an amount of about 0.01 wt. % to about 2 wt. %, or about 0.05 wt. % to about 0.5 wt. %.

Any suitable dye may be used in the non-reactive tinting colorant ink composition including, but not limited to, acid dye(s), direct dye(s), basic dye(s), solvent based dye(s), etc. Preferably, the dye(s) are water soluble, or substantially water soluble. The one or more dyes preferably comprise, consists essentially of, or consist of one or more acid dyes (e.g., Acid Red 18). Generally, acid dyes have functional groups such as azo, triaryl methane, or anthraquinone that include acid substituents, such as nitro, carboxy or sulfonic acid groups. Any acid dye readily ascertainable by those skilled in the art, in any color, pH, etc. may be suitable for use in the non-reactive tinting colorant ink compositions of the present invention, preferably as long as the ink demonstrates enhanced rinsability and/or washability, and/or the same or greater color brightness as the dye(s) alone, as described herein. For example, suitable dyes that are useful in non-reactive tinting colorant ink compositions of the present invention include, but are not limited to, acid blue 9 (Color Index (C.I.) 42090; CAS number 3844-45-9), acid red 52 (CAS number 3520-42-1), acid red 18 (C.I. 16255; CAS number 2611-82-7), acid yellow 17 (C.I. 18965; CAS number 6359-98-4), acid yellow 23 (C.I. 19140; CAS number 1934-21-0), acid yellow 36 (C.I. 13065; CAS number 587-98-4), FD&C Yellow 6 (C.I. 15985; CAS number 2783-94-0), acid red 1 (C.I. 18050; CAS number 3734-67-6), and acid red 87 (C.I. 45380; CAS number 17372-87-1). The dye may be added to the composition in any suitable form, such as solid phase or liquid form. Preferably, the dye is added in dry powdered form. According to particular embodiments, one or more dyes are present in amounts ranging from about 0.1 wt. % to about 15 wt. %.

Any dye blockers readily ascertainable by those skilled in the art may be suitable for use in non-reactive tinting colorant ink compositions of the present invention (e.g., those available under the tradenames Richfix®, or Dow® 2A-1), preferably as long as the ink demonstrates enhanced rinsability and/or washability, and/or the same or greater color brightness as the dye(s) alone, as described herein. Dye blockers may include, for example, sodium octane sulfonate, sodium xylenesulfonate, fatty alcohol ethoxylate, disodium hexadecyldiphenyloxide disulfonate, benzene-1,1-oxybis-tetrapropylene sulfonated sodium, decyl-sulfophenoxy-benzenesulfonic acid-disodium, decyl-sulfophenoxy-benzenesulfonicacid disodium, octylphenoxypolyethoxyethanol, sodium salt of naphthalene-formaldehyde condensate, sodium salt of carboxylated polyelectrolyte, sodium lignin sulfonate, polyethoxylated tert-dodecyl sulfur compound, etc.

According to certain embodiments, the additives may include, but are not limited to, pH adjusters, humectants, buffers, defoamers, preservatives, dispersing agents, and/or scents. Such additives are readily ascertainable by those skilled in the art and are available from numerous sources. The compositions preferably comprise less than about 2% additives (e.g., between about 0.01 wt. % to about 2 wt. % additive(s), or between about 0.01 wt. % to about 1 wt. % additive(s)), more preferably less than about 1 wt. % additive(s), most preferably less than about 0.5 wt. % additive(s). In particular embodiments, the compositions of the present invention do not contain any additives. While a pH adjuster, such as citric acid, may be added to non-reactive tinting colorant ink compositions of the present invention, the compositions preferably do not contain any added pH adjusters, such as acids (separate from other acidic components present in the composition, such as acid dyes). Thus, the one or more additives may include, but are not limited to, humectants, buffers, defoamers, preservatives, dispersing agents, and/or scents. In one embodiment, the one or more additives comprise, consist essentially of, or consist of one or more preservatives (e.g., anti-microbial agents).

For example, according to an embodiment of the present invention, a method for making non-reactive tinting colorant ink compositions described herein comprises, consists essentially of, or consists of (a) dissolving one or more cyclodextrins in water to form a cyclodextrin solution; (b) subsequently adding one or more dyes (e.g., one or more acid dyes) to the cyclodextrin solution to form a cyclodextrin-dye solution; and (c) subsequently adding one or more optional dye blockers to the cyclodextrin-dye solution.

Other Suitable Dyes Resistant to Chemical Attack Such as from a Reducing Agent, Bleaching Agent or High pH Conditions In an embodiment, the non-reactive tinting colorant is highly resistant to chemical attack such as from a reducing agent, bleach, or high pH conditions, as described in U.S. Pat. Nos. 5,326,388, 5,352,282, 5,464,470, 5,478,382, 5,486,228, 5,492,558, and 5,498,282, the disclosures of which are incorporated herein by reference in their entireties.

Dyes to be used in the non-reactive tinting colorant ink composition may be highly resistant to chemical attack such as from a reducing agent or high pH conditions. Dyes meeting this criteria include xanthene dyes, pthalocyanine dyes, and azo dyes which are stable in the presence of a pH of about 10 or greater and/or are stable in the presence of a reducing agent. Dyes which have been found to meet these criteria include PYRANINE 120™ marketed by Miles (Mobay), Acid Red 52 marketed by Carolina Color, Food Red 14 marketed by Hilton-Davis, BASANTOL GREEN 910™ marketed by BASF, Acid Red 87 marketed by Hilton-Davis, Acid Red 92 marketed by International Dyestuffs Corporation, Acid Red 388 and Direct Blue 199 marketed by Crompton & Knowles, and mixtures thereof.

Acid Red dyes, classified as xanthene dyes, are generally used as colorants for foods, drugs and cosmetics. Specifically, Acid Red 87, is the disodium salt of 2,4,5,7-tetrabromo-9-o-carboxyphenyl-6-hydroxy-3-isoxanthone. Acid Red 87 is also called D & C Red No. 22 by the Food and Drug Administration ("FDA"), and sold under the tradenames Eosine YS and Eosine G. In addition, Acid Red 92, the disodium salt of 2,4,5,7-tetrabromo-9-3,4,5,6 tetrachloro-o-carboxylphenyl)-6-hydroxy-3-isoxanthone, is called D & C Red No. 28 by the FDA, and sold under the tradename Phloxine B. Acid Red 52 is a colorant for plastics. Further, Food Red 14 or FD&C Red No. 3, commercially available under the tradenames Erythrosine and Erythrosine Bluish, is the disodium salt of 9(o-carboxyphenyl)-6-hydroxy-2,4,5,7-tetraiodo-3H-xanthen-3-one, which contains smaller amounts of lower iodinated fluoresceins.

Reactive Base &/or Tinting Colorant Ink Component

Any suitable dye that undergoes change by change of pH may be used in the reactive base colorant ink composition including, but not limited to, acid dye(s), direct dye(s), basic dye(s), solvent based dye(s), etc.

Reactive Base Colorants that Change Color at pH of about 10 or Greater

Appropriate reactive base colorant dyes are generally selected to be used in conjunction with the selection of appropriate non-reactive tinting colorant dyes. For example, where a reactive base colorant dye is incapable of maintaining its characteristic color when exposed to a pH of about 10 or greater, a non-reactive tinting colorant dye is selected which is capable of maintaining its characteristic color at such a pH.

Most suitable for use as dyes in the reactive base colorant ink compositions are dyes that are easily destroyed by reducing agent and/or pH. Such coloring compositions are commonly known in the field and are occasionally used as chemically "erasable" inks. Also suitable for use as dyes in the reactive base colorant ink compositions are dyes which are easily destroyed in the presence of a pH of about 10 or greater. Dyes preferably are compatible with the surfactant employed in the reactive base colorant ink composition compositions. Especially suitable for use as dyes in the reactive base colorant ink compositions of the invention are triphenylmethane dyes and azo dyes which are unstable in the presence of a reducing agent and/or a pH of about 10 or greater. Other suitable dyes for use in the base colorant ink composition of the present invention are polymethine dyes, cyanine dyes and methine dyes. Such dyes include the dyes marketed under the tradenames BASACRYL X-RL YELLOW™ (Basic Yellow 49), marketed by the BASF Corporation, ASTRAZON BLUE FRR™ (Basic Blue 69), ASTRAZON BRILLIANT RED 4G™ (Basic Red 14), and ASTRAZON PINK FBB™ (Basic Red 49) by Miles (Mobay); and the dyes marketed under the tradenames Acid Green 3 by International Dyestuffs Corporation, Acid Blue 93 and Acid Violet 19 marketed by Spectra Color Corporation as well as mixtures thereof. Preferred dyes for use in the reactive base colorant ink composition of the present invention are Basic Red 14, Acid Green 3, Acid Violet 19, Acid Blue 93, and mixtures thereof.

The listed ASTRAZON dyes are classified as polymethine dyes. Polymethine dyes are colored substances in which a series of —CH═ (methine) groups connect to terminal groups of a chromophore. Polymethine and cyanine are often used interchangeably as generic terms for all polymethine dyes. The previous primary usage for polymethine dyes are dying acetate rayon as well as polyacrylnitrile and polyacrylamide. Acid Green 3, Acid Blue 93 and Acid Violet 19 are triphenylmethane dyes. Acid Green 3 is commonly used in making pulp colors or lakes. Acid Violet dyes are primarily fashion colors.

To achieve good coloring of the reactive base colorant ink composition, the minimum concentration of dye which will produce a workable ink is governed by the color intensity desired, though as little as 0.05 wt. % of dye may be sufficient for certain applications. The maximum workable concentration of dye is determined largely by the ability to maintain a stable composition and the depth of color desired, and can vary widely depending upon the concentration of other components. It is also a function of the characteristics of the desired end product. In this case, the desired base colorant ink composition is suitable for use as a highlighter and should preferably leave the highlighted indicia easily visible (i.e., legible), either when used alone, or when used in combination with a reactive base colorant ink composition. Optimally, the depth of color of the desired end product should be such that xeroxed copies made of the highlighted material should preferably leave the highlighted indicia easily visible. A practical upper limit in the formulation of, for example, a marker ink comprised of the reactive base colorant ink composition, is about 15 wt. % of dye. The preferred concentration range for most applications is from about 0.05 wt. % to about 5 wt. % of dye, preferably from about 0.05 wt. % to about 1 wt. % of dye, and even more preferably from about 0.1 wt. % to about 0.5 wt. % of dye. A surfactant is also included in the reactive base colorant ink compositions of the multi-component marker ink. Examples of suitable surfactants include anionic surfactants such as disulfonated surfactants. The disulfonated surfactant manufactured by Dow Chemical Co. and sold under the trademark Dowfax 8390 is preferred for use in the reactive base colorant ink compositions of the present invention.

The surfactant is preferably included in the reactive base colorant ink composition such that the reactive base colorant ink composition comprises from about 10 wt. % to about 60 wt. %, preferably from about 20 wt. % to about 40 wt. %, and even more preferably from about 25 wt. % to about 35 wt. % of surfactant. This relatively high amount of surfactant increases the stability of the coloring composition, by helping to maintain the color of the composition. In the context of the present invention, any compatible surfactant which increases the stability of the coloring composition by helping to maintain the color of the composition is suitable provided such surfactant does not negate the read-through capability of the resultant reactive base colorant ink composition. For example, DOWFAX 362 may be used.

The reactive base colorant ink compositions of the present invention are preferably formulated using an acid such as citric acid, or other antioxidant. Inclusion of an acid such as citric acid, or another antioxidant in the reactive base colorant ink composition such that the acid or other antioxidant is present at levels from about 0.1 wt. % to about 3.0 wt. % of the reactive base colorant ink composition maintains a low pH of the composition (i.e., from about 3 to about 6) and, in combination with a surfactant, increases the resistance to fading of a mark produced by the reactive base colorant ink compositions of the present invention on different types of paper, and in particular, on copy paper such as is routinely used in copier machines, and on coated paper having a "waxy-appearing" surface. Acids and other antioxidants other than citric acid can also be employed in the context of the present invention. Generally the antioxidant is employed in an effective amount sufficient to maintain the pH of the reactive base colorant ink composition at about 3 to about 6. Thus, generally, for instance, when citric acid is used, it is present in an amount from about 0.1 wt. % to about 3.0 wt. % of the reactive base colorant ink composition. Preferably the acid such as the citric acid or other antioxidant is contained in the reactive base colorant ink composition in an amount of from about 0.1 wt. % to about 1.0 wt. %, and more preferably from about 0.4 wt. % to about 0.8 wt. %.

The water used in the reactive base colorant ink compositions of the present invention is preferably deionized water. The amount of water present in the reactive base colorant ink compositions is typically from about 10 wt. % to about 90 wt. %, and this amount is in large part determined by the desired end use of the reactive base colorant ink composition, for instance, as an ink, and the amount of other components included in the reactive base colorant ink composition. To achieve a desirable viscosity when the reactive base colorant ink composition is used in the form of, for example, an ink, water is preferably present in the reactive base colorant ink composition in an amount of from about 20 wt. % to about 80 wt. %, and most preferably from about 45 wt. % to about 60 wt. %.

Accordingly, the present invention provides a reactive base colorant ink composition comprising (a) an effective amount of an acid sufficient to maintain the pH of the reactive base colorant ink composition at from about 3 to about 6; (b) from about 0.05 wt. % to about 1 wt. % of a reactive base-color dye; and (c) from about 10 wt. % to about 60 wt. % of a surfactant.

In an embodiment, the multi-component marker ink comprises from about 1 wt. % to about 50 wt. %, or from about 2 wt. % to about 40 wt. %, or from about 5 wt. % to about 30 wt. %, or from about 6 wt. % to about 25 wt. % by volume of non-reactive tinting ink component and from about 50 wt. % to about 100 wt. %, or from about 60 wt. % to about 98 wt. %, or from about 70 wt. % to about 95 wt. %, or from about 75 wt. % to about 94 wt. % of the reactive base-color component ink.

Leuco Dye as Reactive Base Colorant

In an embodiment, the reactive base colorant is a Leuco dye that can be changed from a basic form to an acidic form upon reaction with an acid and will change color upon reaction with an acid present in the second marking composition, as described in U.S. Pat. No. 5,460,647, incorporated herein by reference in its entirety for all purposes.

In an embodiment, the dye used in the reactive base-color ink composition is an oil-soluble Leuco dye, such as those available from BASF. The Leuco dye is one that can be changed from a basic form to an acidic form upon reaction with an acid and will change color upon reaction with the highlighting component. By "change color" is preferably meant a change from one color/hue to another color/hue, although it is also intended to include a change from colored to transparent and a change from transparent to colored. Any Leuco dye can be used in the reactive base-color ink composition as long as it does not adversely affect the marking characteristics of the multi-component marker ink composition.

Examples of Leuco dyes that can be used in the reactive base-color ink composition include 6-(dimethylamino)-3,3-bis(4-dimethyl-amino)phenyl-(3H)-isobenzofuranone (Copikem I Blue, CVL; Hilton Davis Co., Cincinnati, Ohio), 6'-(diethylamino)-3'-methyl-2' (phenylamino)spiro isobenzofuran-1(3H)-9'-(9H)xanthen)-3-one (Copikem 4 Black, N102; Hilton Davis), 2'-di(phenylmethyl)amino-6'-(diethylamino)spiro(isobenzofuran-1(3H), 9'-(9H)xanthen)-3-one (Copikem 5 Green; Hilton Davis), 3,3-bis(1-butyl-2-methyl-1H-indol-3-yl)-1-(3H)-isobenzofuranone (Copikem 20 Magenta; Hilton Davis), and Copikem 37 Yellow (Hilton Davis).

The minimum concentration of dye that will produce a workable solid marking composition is governed by the color intensity and degree of color change desired. The maximum concentration of dye is determined largely by the ability to maintain a stable composition and the depth of color and degree of color change desired and can vary widely depending upon the concentrations of other components.

A Leuco dye is advantageously added to the reactive base-color ink composition in an amount sufficient to provide the multi-component marker ink with the desired first color and resulting color change, upon contact with the highlighting component. The Leuco dye is a chromaphore that acts as a Lewis base, developing color in the presence of a Lewis acid, such as a phenolic resin. The dye(s) is advantageously present in an amount from about 0.5 wt. % to about 5 wt. %, preferably in an amount from about 1 wt. % to about 3 wt. %, most preferably in an amount of about 2 wt. %.

Reactive Base Colorants that Change Color at pH of about 4 or Less

In an embodiment, the reactive base colorant are dyes or indicators whose coloring abilities are easily changed in the presence of a pH of about 4 or less, as described in U.S. Pat. No. 5,489,331, incorporated herein by reference in its entirety.

By "changed" is meant any reaction wherein the color of the dye or indicator is reversibly or irreversibly destroyed or modified. Such coloring compositions are commonly known in the field and are occasionally used as chemically "erasable" inks. Especially suitable for use as dyes in the reactive base-color ink component are those xanthene dyes, pthalocyanine dyes, and azo dyes which are unstable in the presence of a pH of about 4 or less. Dyes which have been found to meet these criteria include Acid Red 92 marketed by International Dyestuffs Corporation, Acid Yellow 1 marketed by International Dyestuffs, PYRANINE 120™, generically referred to as Solvent Green 7 marketed by Miles (Mobay), Solvent Red 48, and mixtures thereof.

Acid Red dyes, classified as xanthene dyes, are generally used as colorants for foods, drugs, and cosmetics. Specifically, Acid Red 92, the disodium salt of 2,4,5,7-tetrabromo-9-3,4,5,6, tetrachloro-o-carboxylphenyl)-6-hydroxy-3-isoxanthone, is called D & C Red No. 28 by the FDA, and sold under the tradename Phloxine B.

Pigments for Use as a Non-Reactive Colorant for Multi-Component Marker Ink

Pigments can be used as colorants in the multi-component marker ink compositions, and can be present in either the base colorant or the tinting colorant. The pigment can be used to enhance or to mask the first color or the second color of the base colorant or the tinting colorant. Any organic or inorganic commercial grade pigment can be used, such as green (Binney & Smith No. DC 161144), orange (Binney & Smith No. DC 161136), red (Binney & Smith No. DC 161138), pink (Binney & Smith No. DC 162904) and yellow (Binney & Smith No. DC 161023) available from Magruder et al., and Radiant EP available from Radiant Color (Richmond, Calif.). However, too much pigment will mask not only the first color of the dye but the color change, itself, whereas too little pigment will not be visible.

In general, a workable pigment dispersion may have a wide or narrow particle size range as long as it does not adversely affect the marking characteristics of the multi-component marker ink composition. Pigments having a mean particle size range from about 0.1 to about 15 µm can be used in the marking compositions. Examples of suitable pigment dispersions include Pigment Red 184, Pigment Blue 15-3, and Pigment Black T (Hoescht Celanese Corp.).

The minimum concentration of pigment which will produce a workable color-changing composition is governed by the color intensity desired. The maximum workable concentration of pigment is determined largely by the ability to maintain a stable composition without adversely affecting the marking characteristics of the multi-component marker ink composition, and can vary widely depending upon the concentration of other components. The pigment is advantageously present in an amount from about 0.5 wt. % to about 10 wt. %, preferably in an amount from about 1 wt. % to about 3 wt. %, most preferably in an amount of about 2 wt. %.

Highlighting Component

The following paragraphs describe chemical and/or physical "triggers" which cause the reactive base ink color to be removed from visibility and/or transformed into a different state, such as state of less color intensity or a transparent state, thereby revealing a secondary color based on the "tinted" ink color.

Acids

Acids which may be used in the highlighting component are typically strong acids, usually having a pH from about 2 to about 4. Typical acids which may be employed in the highlighting component composition of the invention include phosphoric acid, sulfuric acid, and citric acid. The preferred acid for use in the highlighting component composition of the invention is phosphoric acid. Acid is generally present in the highlighting component composition of the invention in an amount from about 0.5% to about 40% with a minimal amount required to allow for changing the first color of the reactive base colorant to a second color of the multi-marker ink composition of the invention and the maximum amount determined by the stability of the composition and the safety of the composition for use by children. Preferably, the acid added in an amount sufficient to lower the pH of the highlighting component composition to a pH of from about 2 to about 4. Preferably, the acid is contained in the highlighting component composition in an amount of from about 5% to about 40%, and most preferably in an amount of from about 20 wt. % to about 30 wt. % of the highlighting component composition.

Amines

The color change-inducing compound used in the highlighting component composition may also be one that will provide a sufficiently high pH, or reducing power, to change the color of the base colorant. In other words, the color change-inducing compound may be sufficiently basic or reductive to change the dye from its acidic or oxidized form to its basic or reduced form. It also preferably is a nonvolatile active component during crayon manufacture and after application to a given surface.

The color change-inducing compound is advantageously an amine, such as triethanolamine or oleyl amine, and/or a hydroxide, such as potassium hydroxide. Preferably, the compound comprises triethanolamine, which is a relatively polar liquid with low volatility, in combination with potassium hydroxide. The potassium hydroxide increases the pH and, therefore, provides a more universal color change-inducing compound. Alternatively, a combination of N-methyl pyrrolidone and potassium hydroxide can be used. A more volatile primary amine, such as oleyl amine, will change color faster but diffuses laterally from a mark on a given surface and loses color over time. Rapid color change and permanence can be attained without such drawbacks by using about an 80/20 or about a 90/10 mix of triethanolamine/oleyl amine. The mix is appropriately used with dyes that change color at a pH≤5, such as bromocresol purple, but not with dyes that require a high pH change.

When amine and hydroxide are used together as the color-change inducer, the amine is advantageously added to the highlighting component composition in an amount up to about 9 wt. %, preferably in an amount up to about 4 wt. If the amine is oleyl amine, it is advantageously added in an amount up to about 3 wt. % preferably in an amount up to about 1 wt. %. Potassium hydroxide is advantageously added in an amount up to about 4 wt. %, preferably in an amount up to about 3 wt. %.

Reducing Agents/Bleaching Agents

Typical reducing agents for use in the highlighting component composition of the invention include hydrogen sulfide, sodium sulfite, sodium hypochlorite, and hydrogen peroxide. The preferred reducing agent for use in the highlighting component composition of the invention is $Na_2SO_3$ (sodium sulfite). Reducing agent is generally present in the highlighting component composition of the invention in an amount from about 1 wt. % to about 20 wt. %, with a minimal amount required to allow to transform the base colorant from a first colored state to a second colored state and the maximum amount determined by the stability of the composition and the safety of the composition for use by children. Preferably, the reducing agent is contained in the highlighting component composition in an amount of from about 5 wt. % to about 15 wt. %, and most preferably in an amount of from about 8 wt. % to about 12 wt. % of the highlighting component composition.

Bases

Bases which may be used in the highlighting component composition of the invention are typically strong bases, usually having a pH of from about 10 to about 12. Typical bases which may be employed in the highlighting component composition of the invention include ammonium hydroxide, sodium hydroxide, and sodium carbonate. The preferred base is sodium hydroxide.

The base is generally present in the highlighting component composition of the invention in an amount from about 0.1 wt. % to about 10 wt. %. Preferably, the base is added in an amount sufficient to raise the pH of the composition to a pH of from about 10 to about 12. Preferably, the base is contained in the highlighting component composition in an amount of from about 0.5% to about 8%, and most preferably from about 1 wt. % to about 5 wt. % of the highlighting component composition.

In further aspects of the invention, a method for tinting an applied ink marking is provided. The method may include 1) applying a multi-component marker ink to a marking surface to provide a base-color marking, wherein the multi-component marker ink comprises a base colorant and a tinting colorant, wherein the base colorant comprises at least one reactive base-color ink component corresponding to an appearance of a base-color marking, and wherein the tinting colorant comprises at least one non-reactive ink component. The method also includes contacting at least a portion of the applied multi-component marker ink with a highlighting component configured to interact with the at least one reactive base-color ink component to change the base colorant from a first colored state to a second colored state based on the tinting color, thereby providing an appearance of a highlighted base-color marking.

In an embodiment, the multi-component marker ink is applied with a first porous marker nib, and at least a portion of the applied multi-component marker ink is contacted with a highlighting component applied with a second porous marker nib.

In another aspect, a unitary marking device for transforming a base-color ink to a tinted color includes a first marking unit having a multi-component marker ink having a base colorant and a tinting colorant; and a second marking unit comprising a highlighting component configured to transform the base colorant from a first colored state to a second colored state based on the tinting colorant, or from a first colored state to a transparent state to reveal the tinting colorant.

In an embodiment, the base colorant is configured to react with the highlighting component such that the base colorant transforms from the first colored state to the second colored state. In an embodiment, the highlighting component comprises a pH-altering highlighting component, and the base colorant comprises a pH-reactive ink. In another embodiment, the highlighting component comprises a blue or UV LED light source, and the base colorant comprises a photochromic ink. In another embodiment, the highlighting component comprises a heat-creating component, and the base colorant comprises a thermochromic ink.

Figure 3:
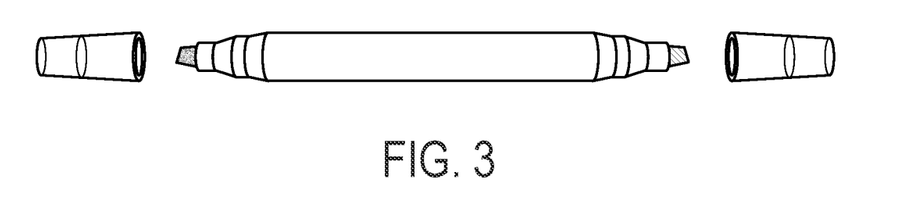
FIG. 3 shows another exemplary unitary marking device having the porous nibs of the first and the second marking units on the opposite ends of the unitary marking device and lids for covering the porous nibs, in accordance with aspects of the invention.
Figure 4:
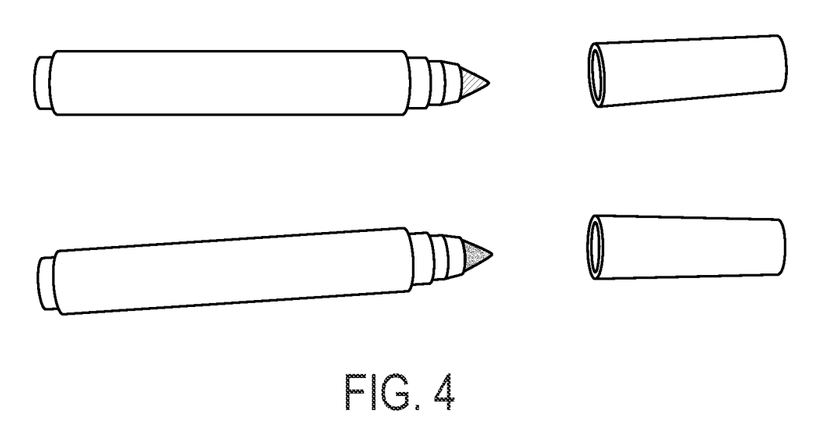
FIG. 4 shows another exemplary unitary marking device having detachable first and the second marking units, as separate marking units, in accordance with aspects of the invention.

In one embodiment, each of the first marking unit and the second marking unit comprises a porous marker nib, as shown in FIGS. 2A, 2B, 3 and 4. In another embodiment, the porous nibs of the first and the second marking units are on the same end of the unitary marking device. In yet another embodiment, the porous nibs of the first and the second marking units are on the opposite ends of the unitary marking device, as shown in FIGS. 2A, 2B and 3. In an embodiment, the first and the second marking units are detachable separate units from the unitary marking device, as shown in FIG. 3. Each of the first marking unit and the second marking unit may also comprise a lid to protect the porous marker nib, as shown in FIGS. 3 and 4.

In an aspect of the unitary marking device, the device may further include a plurality of marking units, such as a third marking unit comprising a second multi-component marker ink comprising a second base colorant and a second tinting colorant, wherein the highlighting component is configured to transform the second base colorant from a third colored state to a fourth colored state based on the second tinting colorant.

As used herein, a "unitary marking device" refers to a marker which is a writing utensil that has one or more marking units. Each "marking unit" comprises an ink source and a tip made of porous or pressed fibers, such as felt (e.g., a felt-tipped pen). Each marking unit may comprise a container (glass, aluminum or plastic) and a core of an absorbent material such as felt. The core preferably serves as the ink source, i.e., a carrier for the ink. According to particular embodiments, the composition is contained inside each marking unit, and a lower viscosity (e.g., between about 2 cP to about 4.5 cP) helps promote wicking through a porous marker nib.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

In an aspect of the present invention, the base colorant of the multi-component marker ink comprises at least one photochromic base-color ink component.

In another embodiment, the highlighting component is a light source such as a blue or UV LED.

Some leuco dyes used for therrmochromism, as disclosed hereinbelow, also exhibit photochromism. Other photochromic materials include spiropyrans and in particular, benzospiropyran photochromic dyes. Suitable benzospiropyran photochromic base colorants include, but are not limited to 6-nitro-8-methoxy-1',3',3'-trimethylspiro[2H-1-benzopyran-2,-2'-indoline]; 6-nitro-8-methoxy-5'-chloro-1',3',3'-trimethylspiro[2H-1-benzopyran-2,2'-in doline]; 6-nitro-8-methoxy-5-bromo-1',3',3'-trimethylspiro[2H-1-benzopyran-2,2'-indo line]; 6-nitro-8-methoxy-5-bromo-5'-chloro-1',3', 3'-trimethylspiro[2H-1-benzopyran-2-2'-indoline]; 6,5'-dinitro-8-methoxy-1',3',3'-trimethylspiro[2H-1-benzopyran-2,2'-indoline]; 6-nitro,8-ethoxy-1',3',3'-trimethylspiro[2H-1-benzopyran-2,2'-indoline].

Other spiropyrans useful in the invention are derivatives of the following classes of compounds: spiro[2H-1-benzopyran-2,2'-[1H]-benzo[g]indoline]; spiro[2H-benzopyran-2, 2'-[1H]-benzo[e]indoline]; spiro[indoline-2,3'-[3H]-naphtho[2,1-b]pyran]; spiro[2H-1-benzopyran-2,2'-benzothiazolines]; spiro[benzothiazoline-2,3'-[3H]-naphtho[2,1-b]pyran]; 2,2'-spirobi[2H-1-benzopyran]; 3,3'-spirobi[3H-naphtho[2,1-b]pyran]; 2,2'-spirobi[2H-naphtho[1,2-b]pyran]; spiro[2H-1-benzopyran-2,3'-[3H]-naphtho[2,1-b]pyran]; spiro[2H-1-benzopyran-2,2'-[2H]-naphtho[1,2-b]pyran]; spiro[4H-1-benzopyran-4,3'-[3H]naphtho[2,1-b]pyran]; spiro[2H-naphtho[1,2-b]pyran-2,3'-[3H]-naphtho[2,1-b]pyran]; spiro[indoline-2,2'-pyrano[3,2-H]quinoline]; spiro[2H-1-benzopyran-2,2'-[2H]quinoline].

Other classes of photochromic dyes for use as base colorants include: triarylmethane dyes, cationic polymethane dyes, indenone oxides, nitrones, bis-imidizoles, hexaarylethanes, b-tetrachloroketodihydronaphthalenes, hydrazines, nitroso-dimers, aryl disulfides, stilbenes, indigoids, azo compounds, polyenes, cyanine dyes, unsaturated azines, p-phenyl ketones, nitro pyridenes, nitrophenyl methanes, p-nitrobenzyl compounds, dihydroxanthenones, bianthrones, trans-15,16-dialkyldihydropyrenes, 2H-pyrans, 2H-thiopyrans, and cis-1-aryl-2-nitroalkenes.

Specific photochromic coating formulations are known in the art. See, for example, U.S. Pat. Nos. 4,367,170, 8,801, 976, and 9,777,178, all of which are expressly incorporated herein by reference. Photoochromic base colorants are commercially available from LCRHallcrest and Chromatic Technologies Inc.

The present invention also provides a method for tinting an applied ink marking, comprising:

applying a multi-component marker ink to a marking surface to provide a base-color marking, wherein the multi-component marker ink comprises a base colorant and a tinting colorant, wherein the base colorant comprises at least one reactive base-color ink component corresponding to an appearance of a base-color marking, and wherein the tinting colorant comprises at least one non-reactive tinting ink component; and irradiating at least a portion of the applied multi-component marker ink with a highlighting component configured to photochemically interact with the at least one photochromic base-color ink component to change the base colorant from a first colored state to a second colored state based on the tinting colorant, thereby providing an appearance of a highlighted base-color marking.

An aspect of the present invention also provides a unitary marking device for transforming a primary ink color to a secondary highlighted color, wherein the marking device comprises:

a first marking unit comprising a multi-component marker ink comprising a base colorant and a tinting colorant; and a second marking unit comprising a highlighting component comprises a light source configured to photochemically transform the base colorant from a first colored state to a second colored state based on the tinting colorant.

In an aspect of the present invention, the base colorant of the multi-component marker ink comprises at least one thermochromic base-color ink component.

In another embodiment, the highlighting component is a heat-creating source such as a rubber nib which, when rubbed on the at least one thermochromic base-color ink component, creates heat through friction, thereby activating the at least one thermochromic base-color ink component. Suitable thermochromic base colorants include, but are not limited to spirolactones, fluorans, spiropyrans, and fulgides. More specifically; thermochromicdyes are based on diphenylmethane phthalide derivatives, phenylindolylphthalide derivatives, indolylphthalide derivatives, diphenylmethane azaphthalide derivatives, phenylindolylazaphthalide derivatives, fluoran derivatives, styrynoquinoline derivatives, and diaza-rhodamine lactone derivatives. These include: 3,3-bis (p-dimethylaminophenyl)-6-dimethylaminophthalide; 3-(4-diethylaminophenyl)-3-(1-ethyl-2-methylindol-3-yl) phthalide; 3,3-bis(1-n-butyl-2-methylindol-3-yl)phthalide; 3,3-bis(2-ethoxy-4-diethylaminophenyl)-4-azaphthalide; 3-[2-ethoxy-4-(N-ethylanilino)phenyl]-3-(1-ethyl-2-methylindol-3-yl)-4-azaphthalide; 3,6-dimethoxyfluoran; 3,6-di-n-butoxyfluoran; 2-methyl-6-(N-ethyl-N-p-tolylamino)fluoran; 3-chloro-6-cyclohexylaminofluoran; 2-methyl-6-cyclohexylaminofluoran; 2-(2-chloroanilino)-6-di-n-butylamino fluoran; 2-(3-trifluoromethylanilino)-6-di-ethylaminofluoran; 2-(N-methylanilino)-6-(N-ethyl-N-p-tolylamino) fluoran, 1,3-dimethyl-6-diethylaminofluoran; 2-chloro-3-methyl-6-diethylamino fluoran; 2-anilino-3- methyl-6-diethylaminofluoran; 2-anilino-3-methyl-6-di-n-butylamino fluoran; 2-xylidino-3-methyl-6-diethylaminofluoran; 1,2-benzo-6-diethylanninofluoran; 1,2-benzo-6-(N-ethyl-N-isobutylamino)fluoran, 1,2-benzo-6-(N-ethyl-N-isoamylamino)fluoran; 2-(3-methoxy-4-dodecoxystyryl) quinoline; spiro[5H-(1)benzopyrano(2,3-d)pyrimidine-5,1' (3'H)isobenzofuran]-3'-one; 2-(diethylamino)-8-(diethylamino)-4-methyl-spiro[5H-(1)benzopyrano(2,3-d) pyrimidine-5,1'(3'H)isobenzofuran]-3'-one; 2-(di-n-butylamino)-8-(di-n-butylamino)-4-methyl-spiro[5H-(1) benzopyrano(2,3-d)pyrimidine-5,1'(3'H)isobenzofuran]-3'-one; 2-(di-n-butylamino)-8-(diethylamino)-4-methyl-spiro [5H-(1)benzopyrano(2,3-d)pyrimidine-5,1'(3'H) isobenzofuran]-3'-one; 2-(di-n-butylamino)-8(N-ethyl-N-isoamylamino)-4-methyl-spiro[5H-(1)benzopyrano(2,3-d) pyrimidine-5,1'(3'H)isobenzofuran]-3'-one; and 2-(di-n-butylamino)-8-(di-n-butylamino)-4-phenyl and trisubstituted pyridines.

Specific thermochromic coating formulations are known in the art. See, for example, U.S. Pat. Nos. 4,720,301, 5,219,625 5,558,700, 5,591,255, 5,997,849, 6,139,779, 6,494,950 and 7,494,537, 9,493,668, 9,745,487 all of which are expressly incorporated herein by reference. These thermochromic coatings are known to use various components in their formulations, and are generally reversible in their color change. Thermochromic; pigments for use in these coatings are commercially available in various colors, with various activation temperatures, clearing points and full color points, such as from LCRHallcrest; Atlanta Chemical Engineering; and Chromatic Technologies Inc.

The following examples are provided to describe the invention in greater detail and are intended to illustrate, not limit, the invention.

Examples

Orimemo Orange ER-25 was purchased from Orient Chemical (Korea). Namei Violet, Namei Blue and Namei D-1000 Green were purchased from Zhejiang Namei Material Technology. D-200 fluid, the highlighting component in this example, was obtained from Zhejiang Namei Material Technology.

Multi-Component Marker Ink Compositions

The following multi-component marker inks were prepared by blending non-reactive tinting colorant with corresponding reactive base colorant:

TABLE 1

| Multi-Component Marker | | |
|---|---|---|
| Base color of the a multi-component marker ink | Reactive Base colorant | Non-Reactive Tinting Colorant |
| Orange | 80 wt. % Orimemo Orange ER-25 | 80 wt. % Ultraclean Orange |
| Violet | 88 wt. % Namei Violet | 12 wt. % Ultraclean Violet |
| Blue | 91 wt. % Namei Blue | 9 wt. % Ultraclean Azure |
| Green | 80 wt. % Namei D-1000 Green | 20 wt. % Graphic Green |

Table 2 shown below lists sample composition of Ultraclean non-reactive tinting colorants of Table 1:

TABLE 2

| Sample Composition of Non-Reactive Tinting Ink Composition | |
|---|---|
| Component | Weight % |
| DI Water | 73.5-84.45 |
| Hydroxypropyl beta cyclodextrin | 10-30 |
| Acid dye (Orange, Violet, Azure) | 0.5-8 |
| Dye blockers | 5-35 |
| Surfactant | 0.05-5 |
| Total | 100.0 |

Graphic Green of Table 1 had the following sample composition, as shown in Table 3:

TABLE 3

| Sample Composition of Non-Reactive Tinting Ink Composition | |
|---|---|
| Component | Weight % |
| DI Water | 55-80 |
| Polymer solution for water solubility | 10-30 |
| Dye Premix (Green) | 0.5-8 |
| Humectant | 5-35 |
| Preservatives | 0.05-5 |
| Total | 100.0 |

For tinting an applied marking, each ink of the multicomponent mark inks was filled into a first marking unit, such as a marker. A second marking unit, such as another marker was filled with D-200 Fluid (an aqueous solution having a pH of about 10), a highlighting component. After applying the multi-component marker ink to a marking surface to provide a base-color marking, at least a portion of the applied multi-component marker ink was contacted with the D-200 fluid, a highlighting component to provide an appearance of a highlighted base-color marking.

The invention claimed is:

1. An integrated highlighting marker system, comprising: a multi-component marker ink comprising a base colorant and a tinting colorant; and a highlighting component configured to transform the base colorant from a first colored state to a second colored state based on the tinting colorant, wherein the highlighting component comprises one or more of a bleaching agent and a reducing agent.

2. The integrated highlighting marker system of claim 1, wherein the second colored state is transparent, such that the color of the tinting colorant is revealed.

3. The integrated highlighting marker system of claim 1, further comprising at least one porous marker nib.

4. The integrated highlighting marker system of claim 1, wherein the base colorant comprises at least one reactive base-color ink component and the tinting colorant comprises at least one non-reactive tinting ink component.

5. The integrated highlighting marker system of claim 1, wherein the at least one reactive base-color ink component is selected from the group consisting of a photochromic ink, a thermochromic ink, and a pH-reactive ink.

6. The integrated highlighting marker system of claim 5, wherein the highlighting component is selected from the group consisting of a light source, a heat-creating source, and a pH-altering agent.

7. The integrated highlighting marker system of claim 1, wherein the base colorant comprises two or more reactive base-color ink components, and wherein each of the two or more reactive base-color ink components reacts at a different pH.

8. A method for changing the color of a portion of an applied ink marking, said method comprising:
  applying a multi-component marker ink to a marking surface to provide a base-color marking, wherein the multi-component marker ink comprises a base colorant and tinting colorant, wherein the base colorant comprises at least one reactive base-color ink component corresponding to an appearance of a base-color marking, and wherein the tinting colorant comprises at least one non-reactive tinting ink component; and
  contacting at least a portion of the applied multi-component marker ink with a highlighting component configured to interact with the at least one reactive base-color ink component to change the base colorant from a colored state to a second colored state based on the tinting colorant, thereby providing an appearance of a highlighted base-color marking.

9. The method of claim 8, wherein the multi-component marker ink is applied with a first porous marker nib, and wherein at least a portion of the applied multi-component marker ink is contacted with the highlighting component applied with a second porous marker nib.

10. The method of claim 8, wherein the highlighting component is a pH-altering agent, a bleaching agent, or a reducing agent.

11. A unitary marking device for transforming a base-color marking to a highlighted base-color marking, wherein the marking device comprises:
  a first marking unit comprising a multi-component marker ink comprising a base colorant and a tinting colorant; and
  a second marking unit comprising a highlighting component configured to transform the base colorant from a first colored state to a second colored state based on the tinting colorant,
  wherein the highlighting component comprises a pH-altering highlighting component, and the base colorant comprises a pH-reactive ink.

12. The unitary marking device of claim 11, wherein each of the first marking unit and the second marking unit comprises a porous marker nib.

13. The unitary marking device of claim 11, wherein the second colored state is transparent, such that the color of the tinting colorant is revealed.

14. The unitary marking device of claim 11, wherein the base colorant is configured to react with the highlighting component such that the base colorant transforms from the first colored state to the second colored state.

15. The unitary marking device of claim 11 further comprising a third marking unit comprising a second multi-component marker ink comprising a second base colorant and a second tinting colorant, wherein a second highlighting component is configured to transform the second base colorant from a third colored state to a fourth colored state based on the second tinting colorant.

16. The unitary marking device of claim 15, wherein the highlighting component comprises a a-heat-creating component, and the second base colorant comprising a thermochromic ink.

17. The unitary marking device of claim 15, wherein the highlighting component comprises a blue or UV light source, and the second base colorant comprising a photochromic ink.

* * * * *

UNITED STATES PATENT AND TRADEMARK OFFICE
CERTIFICATE OF CORRECTION

PATENT NO.         : 11,007,813 B2
APPLICATION NO.    : 16/394356
DATED              : May 18, 2021
INVENTOR(S)        : Craig Skinner It is certified that error appears in the above-identified patent and that said Letters Patent is hereby corrected as shown below:

On the Title Page

Item (57) ABSTRACT, Line 1, "marker includes" should read -- marker system includes --

Signed and Sealed this
Twenty-seventh Day of July, 2021

Drew Hirshfeld
*Performing the Functions and Duties of the
Under Secretary of Commerce for Intellectual Property and
Director of the United States Patent and Trademark Office*